United States Patent [19]

Hoffman et al.

[11] 3,855,397

[45] Dec. 17, 1974

[54] METHOD OF PRODUCING SODIUM CARBONATE AND BICARBONATE SPHERULES FROM BRINE

[75] Inventors: Robert J. Hoffman, Liverpool; Alan G. Follows, Camillus, both of N.Y.

[73] Assignee: Allied Chemical Corporation, New York, N.Y.

[22] Filed: Apr. 12, 1973

[21] Appl. No.: 350,453

[52] U.S. Cl.............. 423/422, 23/302, 423/190, 423/266, 423/424, 423/426
[51] Int. Cl......... C01d 7/10, C01d 7/40, C01d 7/12
[58] Field of Search .......... 423/186, 187, 188, 190, 423/209, 266, 419, 422, 423, 424, 425, 426, 427, 429; 23/300, 301 R, 302

[56] References Cited
UNITED STATES PATENTS

| | | | |
|---|---|---|---|
| 364,552 | 6/1887 | Soluay | 423/188 |
| 1,921,505 | 8/1933 | Chesney | 423/421 |
| 2,773,739 | 12/1956 | Burkholder | 23/302 |
| 2,842,489 | 7/1958 | Suanor | 423/425 |
| 3,072,466 | 1/1963 | Bauer et al. | 23/300 |
| 3,719,745 | 3/1973 | Saeman | 423/427 |

OTHER PUBLICATIONS

Aslanyan S., Comt. Rend. Acad. Bulgare. Sci. 18 (8) 759-762 (1965) as abstracted by Chemical Abstracts, Vol. 63, 1965, 17246f.

*Primary Examiner*—Oscar R. Vertiz
*Assistant Examiner*—Gary P. Straub
*Attorney, Agent, or Firm*—G. P. Rooney; G. H. Fuchs

[57] ABSTRACT

Free-flowing spherules of sodium bicarbonate are prepared from a sodium carbonate or from salt brine, substantially saturated with ammonia, by carbonating the sodium carbonate solution, or the ammonia-saturated brine with carbon dioxide in the presence of from 200 to 2500 parts per million of a water soluble alkaline phosphate. Spherules of sodium bicarbonate crystallizing from the solutions are separated as a product having a bulk density between about 32 to 48 pounds per cubic foot, and a screen size substantially between 14 and 100 mesh. Sodium carbonate spherules are also readily obtained by calcining the sodium bicarbonate spherules.

8 Claims, 4 Drawing Figures

(A) COMMERCIAL SODIUM BICARBONATE
    (UNSCREENED)           (X 20)
    No Additive
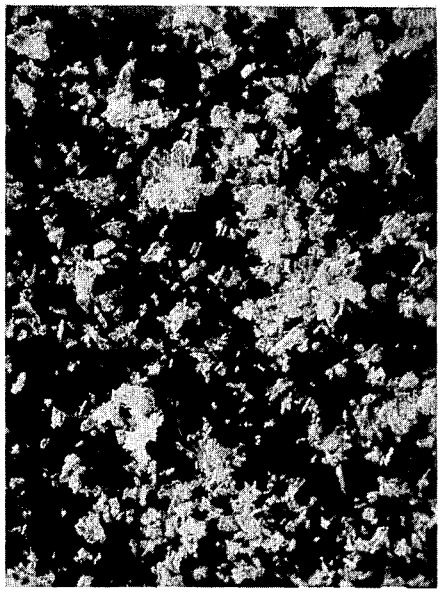
(B) SODIUM BICARBONATE SPHERULES
    (-80 +100 MESH)        (X 20)
    1600 PPM SHMP
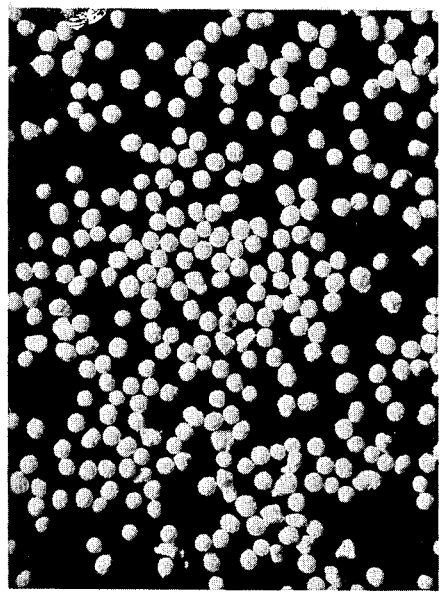
(C) SODIUM BICARBONATE SPHERULES
    (-20 +30 MESH)         (X 20)
    1600 PPM SHMP
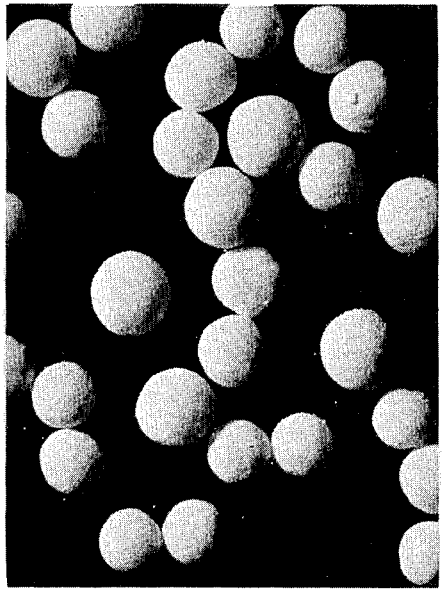
(D) SODIUM BICARBONATE SPHERULE
    (CROSS SECTION)        (X 80)
    1600 PPM SHMP
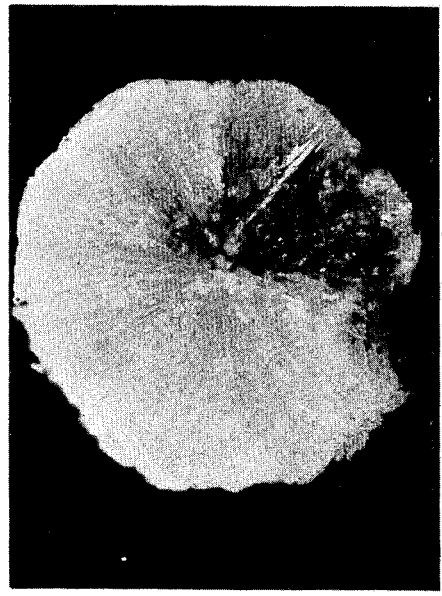

METHOD OF PRODUCING SODIUM CARBONATE AND BICARBONATE SPHERULES FROM BRINE

CROSS-REFERENCE TO RELATED APPLICATIONS

Commonly assigned U.S. Ser. Nos. 350,454 and 350,455, filed of even date herewith, respectively disclose methods for making similar crystalline, free-flowing sodium bicarbonate product of spherical particle shape from sodium hydroxide/sodium chloride solution (weak electrolytic cell liquor), and from sodium sesquicarbonate solution.

BACKGROUND OF THE INVENTION

1. Field of the Invention

A large proportion of the sodium bicarbonate produced commercially is a product of the Solvay Process, one step of which comprises the carbonation of ammoniacal salt brine. Most of the ammonia-contaminated sodium bicarbonate thus produced is calcined to drive off water vapor, carbon dioxide and ammonia, thereby producing a commercial soda ash.

Sodium bicarbonate of high purity is also produced by introducing gaseous carbon dioxide into a solution of sodium carbonate of such concentration that sodium bicarbonate crystallizes as the solution becomes fully saturated with carbon dioxide. The crystals resulting from this process or from the carbonation of the ammoniacal brine solution are generally very fine and have twinned or dendritic structures which are physically weak and readily fragmentate on handling. Particle sizes are usually finer than 100 mesh. The dried product generally has bulk densities in the range of 50 to 60 pounds per cubic foot.

Special uses have developed for both sodium carbonate and sodium bicarbonate in which a higher density, coarse particulate, free-flowing, non-dusting product is desired. A dense, coarse-grained sodium carbonate (soda ash) is demanded by the glass industry, which industry is a major consumer of this commodity. Coarse-grained soda ash produces less dust than the more bulky "light" variety, and mixes well with sand and lime in the preparation of feed for the glass furnaces. Frequently commercial dense soda ash contains more calcium as a contaminant than does light soda ash, as calcium chloride is sometimes added to effect control over crystal size.

In the case of sodium bicarbonate, which finds application as a pharmaceutical and in formulations such as baking powders, the slower dissolving spherules can extend their period of effectiveness and reduce the bicarbonate concentration per unit of time.

2. Description of the Prior Art

Attempts to improve the crystal structure of sodium bicarbonate have been made in the past and are the subject of continuing research. Emphasis has usually been placed on producing a larger, less fragile crystal than that normally obtained commercially. Sodium bicarbonate having a particle size greater than 100 mesh is preferred.

Crystallization techniques have been employed to produce relatively dense sodium carbonate and sodium bicarbonate, but these products are generally granular, and though relatively free flowing and less conductive to the production of dust than the more conventional varieties of sodium carbonate and bicarbonate, nevertheless leave considerable room for improvement.

SUMMARY OF THE INVENTION

The present invention is particularly directed to a method for producing a novel and useful sodium bicarbonate in the form of small to fine spheres. These spherules possess unusual properties heretofore not associated with this product. These spherules may be characterized as hard, substantially uniform, free-flowing crystalline spherical particles of sodium bicarbonate which are much more durable than conventional sodium bicarbonate particles. Dust production on handling is minimal and good yields of material having a particle size greater than 100 mesh may be readily obtained.

Surprisingly, sodium bicarbonate spherules retain their shape and hardness during calcining. A corresponding new form of sodium carbonate, therefore, may be prepared from this bicarbonate product.

Both the free-flowing, non-caking, substantially dust-free sodium bicarbonate and carbonate can be produced in conventional equipment with substantially no increase in cost over the usual manufacturing methods. In fact, the spherical form tends to simplify processing.

In a process for the preparation of sodium bicarbonate from a solution of the sodium salt of an acid, such as carbonic acid, which comprises carbonating the solution under conditions sufficient to effect conversion of the sodium salt to bicarbonate, the present invention is directed to the improvement which comprises providing in the solution before carbonating, from 200 to 2500 parts per million (ppm) by weight of a water-soluble alkaline phosphorus-containing compound, based on the weight of the pre-carbonated solution, and recovering sodium bicarbonate substantially in the form of crystalline spherules from the carbonated solution.

A process is herein disclosed for producing sodium bicarbonate in the form of crystalline spherules from a sodium chloride solution containing between about 15 to 25 percent NaCl substantially saturated with $NH_3$. As with the sodium carbonate solution, the process comprises introducing 200 to 2500 ppm by weight of a water-soluble alkaline phosphate, and carbonating the solution under conditions sufficient to effect carbonation while maintaining the temperature below about 70°C. until substantially all of the sodium chloride present in said solution is converted to sodium bicarbonate. Sodium bicarbonate spherules are then recovered from the solution. Preferably, the solution is cooled to below about 35°C. after carbonation is complete, before the spherules are separated.

The spherules are dried, providing a fine, free-flowing sodium bicarbonate product.

If a sodium carbonate-product consisting of comparatively hard free-flowing spherules is desired, it is only necessary to calcine the sodium bicarbonate spherules at temperatures ranging from about 150° to 350°C.

BRIEF DESCRIPTION OF THE ILLUSTRATIONS

The accompanying illustrations comprise reproductions of photomicrographs of:

a. Commercial sodium bicarbonate (unscreened) (×20).

b. Sodium bicarbonate spherules (−80 + 100 mesh) prepared from ammoniacal salt brine solution with 1600 ppm sodium hexametaphosphate (×20).

c. Sodium bicarbonate spherules (−20 + 30 mesh) prepared from ammoniacal salt brine solution with 1600 ppm sodium hexametaphosphate (×20).

d. Cross section, sodium bicarbonate spherule revealing crystalline structure (×80).

DESCRIPTION OF THE PREFERRED EMBODIMENTS

In the well-known Solvay Process, sodium bicarbonate and sodium carbonate are prepared continuously from limestone and salt brine, the overall equation being:

$$CaCO_3 + 2NaCl \rightarrow Na_2CO_3 + CaCl_2.$$

Ammonia enters into the process but is almost totally recovered (up to 99.8 percent) and recycled, so is not a raw material in the usual sense.

An important step in the process comprises the pumping of a clear ammoniated brine into the top of a high Solvay Tower, countercurrent to a stream of carbon dioxide (lime kiln gas) which is fed into the bottom of the tower at a pressure of about 45 psig. The carbon dioxide is absorbed, and the nitrogen which constitutes about 60 percent of the lime kiln gas is vented from the top of the tower into a general vent system. The solution drawn from the bottom of the tower is pumped to the top of one or more other packed towers for further carbonation with a countercurrent stream of stronger carbon dioxide than that used in the first tower, this gas being obtained at least in part from bicarbonate calciners.

This reaction is exothermic. The temperature is generally kept below about 65°C. with cooling, and is gradually cooled down to below about 35°C., the rate and degree of cooling being dependent on the crystal size desired.

In the modification of the present invention, a quantity of one or more water-soluble alkaline phosphorus-containing materials in the amount of about 200 to 2500 parts per million (ppm) by weight or preferably about 300 to 2000 ppm are added to the ammoniacal brine feed to the first Solvay Process tower. The phosphorus-containing material, if desired, may be added to the carbonated or partially carbonated solution at any time prior to the start of crystallization, but preferably it is added to the ammoniacal brine feed to the Solvay tower.

By a water-soluble alkaline phosphorus-containing material, we refer to the water-soluble alkali metal phosphates, hypophosphates, phosphites, hypophosphites and phosphides, and to the water-soluble alkaline earth metal phosphates, hypophosphates, phosphites, hypophosphites and phosphides.

The preferred alkaline phosphorus-containing materials are the alkali-metal phosphates: $(NaPO_3)_6$ (SHMP); $(K_5P_3O_{10})$; $(Na_5P_3O_{10})$; $(Na_4P_2O_7)$ and $(K_4P_2O_7)$.

The most desirable of these additives is the sodium hexametaphosphate (SHMP).

Preferably, the solution is carbonated with agitation by the introduction of carbon dioxide gas at temperatures below 70°C. When the carbonation is complete, the solution is cooled to about 30°C., and the sodium bicarbonate spherules separated from the liquor. The handling of this slurry, particularly the filtering step, is facilitated as a result of the spherical form of the particles. Generally, the product is separated by rotary vacuum filters or in cycle-controlled, continuously runnng centrifuges. The spherules may be washed sparingly with water or a sodium bicarbonate solution, then dried or calcined. As the product will be contaminated with ammonia, it is generally calcined in rotary calciners at about 175° to 350°C. to obtain spherules of sodium carbonate.

The size, form and hardness of the spherules can be controlled by the choice and concentration of the phosphorus-containing additive, and the temperature and rate of cooling employed during the crystallization. A very desirable spherule can be obtained using 1600 ppm sodium hexametaphosphate as the additive, and a carbonation temperature of 45°C., followed by crystallization with the temperature slowly dropping with agitation to 30°C.

In order to obtain spherules of pure sodium bicarbonate free of ammonia, the carbonated ammoniacal brine solution from the Solvay Process may be blown with steam to remove ammonia, and carbonated further, as some carbon dioxide will be lost as well. Preferably, the tower feed should consist of a relatively pure, substantially saturated solution of soda ash, passed countercurrent to a stream of relatively pure carbon dioxide, said soda ash solution being at about 38°C. to 45°C.

Cooling and product separation can be carried out as previously described. Excellent spherules are obtained with 1200 to 2000 ppm of sodium hexametaphosphate as the additive, preferably introduced before the absorption of the carbon dioxide, but at any time prior to actual product separation.

The ability of $K_5P_3O_{10}$; $Na_5P_3O_{10}$; $K_4P_2O_7$ and $Na_4P_2O_7$ to produce spheres is considerably less than that of the preferred phosphate $(NaPO_3)_6$. These compounds tend to form a particle intermediate between the normal crystal and the fully developed sphere.

EXAMPLE 1

500 Milliliters (ml) of a Solvay Process tower feed liquor consisting of an ammoniacal salt brine solution having the following composition:

| | |
|---|---|
| Alkalinity due to $CO_2$ (as $Na_2CO_3$) | 164 grams/liter (g/l) |
| NaCl | 262 g/l |
| $NH_3$ | 85 g/l |
| $(NH_4)_2S$ | Trace | to which 1600 ppm of sodium hexametaphosphate (SHMP) was added, (weight basis) was placed in a 1000 ml., 3-neck flash equipped with stirrer, thermometer, gas inlet tube and relief valve. The system was connected to a mercury manometer to indicate the pressure in the system. The flask was flushed with pure $CO_2$ for thirty seconds at a rate of 500 ml/min with the relief valve open.

Carbonation was carried out at room temperature over a 3 hour period at a rate of 200 ml/min. and at atmospheric pressure ± 30 mm. The temperature increased to 40°C. during the run due to the heat of reaction. The rate of $CO_2$ absorption was controlled, in part, by increasing the speed of agitation. Occasional venting of the system to reduce unsafe pressure was necessary as the run proceeded.

At the end of the carbonation, the solution was cooled to 30°C., filtered, washed with saturated bicarbonate solution, followed with acetone and air dried.

The solids obtained weighed 115 g. and consisted predominantly of spherical particles over 100 mesh. Screen analysis of the material is presented in Table I.

TABLE I

SCREEN ANALYSIS
SPHERICAL NaHCO₃ FROM AMMONIACAL SALT BRINE COLUMN FEED LIQUOR

| U.S. Standard Sieve (Mesh) | Wt. (grams) | % of Total Solids |
|---|---|---|
| On 20 | 7.3 | 4.7 |
| 30 | 58.3 | 50.5 |
| 40 | 14.1 | 12.2 |
| 60 | 15.0 | 13.0 |
| 80 | 8.9 | 7.7 |
| 100 | 3.2 | 2.8 |
| 140 | 3.3 | 2.9 |
| 170 | 2.0 | 1.7 |
| 200 | 1.1 | 1.0 |
| −200 | 2.2 | 1.9 |

Photomicrographs (b) and (c) of FIG. 1 (20 × magnification) show a portion of the +30 mesh and the +100 mesh product, and photomicrograph (d) reveals at 80 × magnification, the crystalline structure of a cross-section of a spherule. As can be seen, the spherule is actually a spherulite or sphero-crystal in that it consists of crystals radiating from a central point in all directions. They radiate to substantially an equal degree to thereby form a sphere. The longer the crystals, the greater the radius of the sphere.

EXAMPLE 2

The procedure of Example 1 was repeated at a SHMP concentration of 1000 ppm. Production consisted almost entirely of hard, irregularly shaped spheres. It will be noted that a greater quantity of SHMP is preferable if greater particle sphericity is desired, as obtained in EXample 1.

EXAMPLE 3

The procedure of Example 1 was repeated except that the phosphorus-containing additive was 1500 ppm of $Na_5P_3O_{10}$. The spherules obtained, falling substantially between −100 and +140 mesh, were hard, free-flowing spherical granules.

EXAMPLE 4

The procedure of Example 1 was again repeated, except that the phosphorus-containing additive was 1500 ppm of $K_4P_2O_7$. The crystalline spherules (−100, +140) were quite similar to the spherical granules obtained in Example 3. They were harder, more durable and more free-flowing than material prepared in the absence of phosphorus-containing additives.

EXAMPLE 5

It is well known that sodium bicarbonate as it is generally produced commercially, consists of fragile crystals and crystal agglomerates which are easily broken during processing and handling (see photomicrograph (a) of FIG. 1). Such material, when subjected to a standard friability test is degraded by as much as 30 percent or more. By regulation of feed liquor and SHMP concentrations, it is possible to produce spherical sodidum bicarbonate that will show 0–10 percent degradation when subjected to the same test.

A standard method was developed for the determination of friability as follows:

FRIABILITY DETERMINATION

Procedure:
1. Sieve a representative sample of the sodium bicarbonate or carbonate product weighing 100 grams for 10 minutes on a "RoTap Sieve Shaker" using Nos. 20 and 100 U.S. Standard Sieves.
2. Collect the fraction retained on the No. 100 Sieve.
3. Weigh a 20 gram portion of the +100 Sieve portion and add 50 grams of dry 5 mm. glass beads.
4. Cover the No. 100 Sieve and add collection pan. Shake on the RoTap Sieve Shaker for 10 minutes.
5. Weigh the fraction retained on the No. 100 Sieve and the fraction in the collection pan.

Calculation:

$$100 \times \frac{\text{Wt. of fraction in pan}}{\text{Wt. of fraction on 100 Sieve plus wt. of fraction in pan}} = \text{Percent friability}$$

A quantity of spherical sodium bicarbonate product from Example 1 was subjected to the above friability test. The "% friability" according to the test method was found to be 1.8 percent.

The same product was calcined at 250°–300°C. to convert the bicarbonate to carbonate. The spherules retained their shape. The % friability of the sodium carbonate spherules thus produced, was 2.5 percent. The durability of these particles is far superior to that of the conventional product, or that produced in the presence of a concentration of 400 ppm of SHMP or less.

A synthetic mixture of NaHCO₃ spheres, prepared by the process of this invention using sodium hexametaphosphate was made to conform to the published screen sizes for normal Grade 5 RBC sodium bicarbonate.

TABLE II

TYPICAL SCREEN SIZE-COMMERCIAL SODIUM BICARBONATE - GRADE NO. 5

| U.S. Standard Sieves | Synthetic Sample adjusted to: | Commercial Product (Church & Dwight) |
|---|---|---|
| % on No. 42 | Trace | Trace |
| do. 65 | 27.0 | 27.0 |
| do. 100 | 65.5 | 65.5 |
| do. 170 | 6.5 | 6.5 |
| do. 200 | 0.7 | 0.7 |
| do. 325 | 0.1 | 0.1 |
| do. 400 | 0.1 | 0.1 |
| Through 400 | 0.1 | 0.1 |

The time required for complete solution of identical quantities of each of the above samples in water at 65°C. with agitation was determined.

Commercial Grade No. 5     50 seconds
Synthetic Sample (NaPO₃)₆ Process     88 seconds The increased time of solution for the product of the present invention appears to be due to the dense nature and minimal surface of the individual spheres.

Analytical data indicate that the bulk of the phosphate added to the feed liquors is concentrated in the formed sodium bicarbonate sphere with a lesser amount being retained in the filtrate. Where the additive was between 200 and 1500 ppm of sodium hexametaphosphate, the concentration of this salt in the spherules produced ranged from 1000 to 4500 ppm, with that remaining in the filtrate ranging from 10 to 330 ppm.

It has also been determined that when a phosphate additive is introduced into a sodium bicarbonate crystallization system, the first evidence of crystallization, or the cloud point is delayed, the delay being roughly related to the charge of phosphate additive. For example, in a sodium bicarbonate crystallizing system where the additive was sodium hexametaphosphate, the following relationship was observed:

TABLE III

| SHMP (ppm) | Carbonation, time to Cloud Point |
|---|---|
| 0 | 10 minutes |
| 100 | 12 minutes |
| 500 | 23 minutes |
| 700 | 46 minutes |
| 1000 | 68 minutes |

The particles obtained when the SHMP concentration was 500 ppm and above, were spherical.

Phosphate additions greater than 2000 ppm are not recommended as the yield falls off at higher concentrations.

In conclusion, the crystalline spherules produced by the present process may be characterized as hard, free-flowing sperocrystals or spherulites, being aggregates of elongated crystals radiating from a central point. The spherulites generally have a bulk density of about 32 to 48 lbs/ft$^3$, a friability rating according to the test method previously given of less than about 10 percent and a soluble alkaline phosphate content of between about 1000 and 5000 ppm. At least about 75 percent of the spherulites have an average diameter greater than 0.15 mm, or in other words, at least about 75 percent of the spherulites will remain on a 100 mesh sieve (U.S. Standard).

Since changes may be made in carrying out the above process without departing from the scope of the invention, it is intended that all matter contained in the above description shall be interpreted as illustrative and not in a limiting sense.

We claim:

1. A process for making sodium bicarbonate in the form of crystalline spherules from a solution containing between about 15 to 25 percent of sodium salt selected from the group consisting of sodium chloride and sodium carbonate, which comprises adding from 200 to 2500 parts per million by weight of the solution of a water-soluble alkaline phosphorus-containing compound selected from the group consisting of alkali metal and alkaline earth metal phosphate, hypophosphates, phosphites, hypophosphites and phosphides, and carbonating the solution under condition to effect conversion of the sodium salt to sodium bicarbonate, and recovering the sodium bicarbonate substantially in the form of crystalline spherules.

2. The process as claimed in claim 1 wherein the water soluble alkaline phosphate is selected from the group consisting of the water soluble phosphates, hypophosphates, phosphites, hypophosphites, and phosphides of the alkali metals.

3. The process as claimed in claim 1 wherein the water soluble alkaline phosphate is selected from the group consisting of $(NaPO_3)_6$; $K_5P_3O_{10}$; $Na_5P_3O_{10}$; $Na_4P_2O_7$ and $K_4P_2O_7$.

4. The process as claimed in claim 1 wherein the water soluble alkaline phosphate is $(NaPO_3)_6$ and the quantity used is within the range of 300 to 2000 ppm.

5. The process as claimed in claim 1 wherein the crystalline spherules of sodium bicarbonate are dried, and calcined at 150°–350°C. to provide a sodium carbonate product substantially in the form of spherical particles.

6. A process for making sodium bicarbonate in the form of crystalline spherules from a sodium carbonate solution containing between about 15 to 25 percent sodium carbonate, comprising:
   a. introducing 200 to 2500 ppm by weight of a water-soluble alkaline phosphate selected from the group consisting of alkali metal and alkaline earth metal phosphates, hypophosphates, phosphites, hypophosphites and phosphides;
   b. carbonating the solution under conditions to effect carbonation while maintaining the temperature below about 70°C. until substantially all of the carbonate is converted to bicarbonate;
   c. cooling the solution to below about 35°C.; and
   d. recovering the sodium bicarbonate from the carbonated solution.

7. A process for making sodium bicarbonate in the form of crystalline spherules from a sodium chloride solution containing between about 15 to 25 percent sodium chloride substantially saturated with $NH_3$, comprising:
   a. introducing 200 to 2500 ppm by weight of a water-soluble alkaline phosphate selected from the group consisting of alkali metal and alkaline earth metal phosphates, hypophosphates, phosphites, hypophosphites and phosphides;
   b. carbonating the solution under conditions to effect carbonation while maintaining the temperature below about 70°C. until substantially all of the sodium chloride present in said solution is converted to sodium bicarbonate;
   c. cooling the solution to below about 35°C.; and
   d. recovering the sodium bicarbonate from the carbonated solution.

8. The process as claimed in claim 7 wherein the water-soluble alkaline phosphate is sodium hexametaphosphate, present in the solution to the extent of between 300 and 2000 ppm.

* * * * *